United States Patent [19]

Sawai

[11] 4,207,528
[45] Jun. 10, 1980

[54] TIMING-PHASE CONTROL SYSTEM FOR DUOBINARY TRANSMISSION

[75] Inventor: Akira Sawai, Tokyo, Japan

[73] Assignees: Nippon Electric Co., Ltd., Tokyo, Japan; Nippon Electric Co., Ltd., Tokyo, Japan

[21] Appl. No.: 12,090

[22] Filed: Feb. 14, 1979

[30] Foreign Application Priority Data

Feb. 15, 1978 [JP] Japan ............................... 53/1697878

[51] Int. Cl.² ..................... H04L 25/60; H03K 11/00; H04B 3/36
[52] U.S. Cl. .................................... 375/20; 328/155; 178/70 R; 375/4; 375/97
[58] Field of Search ...................... 178/66 R, 67, 69.1, 178/70 R, 70 S, 70 TS; 179/16 E, 16 EA; 325/38 A, 13, 63, 321, 323, 328, 329, 418; 328/127, 133, 155; 329/122, 123; 358/23, 158; 364/732

[56] References Cited

U.S. PATENT DOCUMENTS

| | | | |
|---|---|---|---|
| 2,227,902 | 1/1941 | Hahnle | 325/328 |
| 4,078,159 | 3/1978 | Lender et al. | 178/68 |
| 4,123,625 | 10/1978 | Chow | 179/16 EA |

*Primary Examiner*—Benedict V. Safourek
*Attorney, Agent, or Firm*—Sughrue, Rothwell, Mion, Zinn and Macpeak; Sughrue, Rothwell, Mion, Zinn and Macpeak

[57] ABSTRACT

A timing-phase control system provided on the receiving side of a duobinary transmission system is adaptable to high-speed PCM repeater systems using a wide-band transmission medium such as a coaxial cable. The system includes a discriminating and regenerating circuit for recovering the transmitted digital signal by discriminating and regenerating in an appropriate timing phase based on an input equalized duobinary waveform, a phase varying circuit for varying the phase of a timing signal externally supplied to the discriminating and regenerating circuit, and a derivative waveform generating circuit. In one embodiment, the derivative waveform generating circuit is responsive to the output of the discriminating and regenerating circuit, and a multiplier multiplies the output of the derivative waveform generating circuit and the equalized duobinary waveform by each other in a predetermined phase relationship. In another embodiment, the derivative waveform generating circuit differentiates the equalized duobinary waveform on a time scale, and a multiplier multiplies the output of this differentiating circuit and that of the discriminating and regenerating circuit in a predetermined phase relationship. In either case, a low-pass amplifier amplifies the output of the multiplier to provide, with a suitable D.C. offset, a negative feedback signal to the phase varying circuit.

2 Claims, 10 Drawing Figures

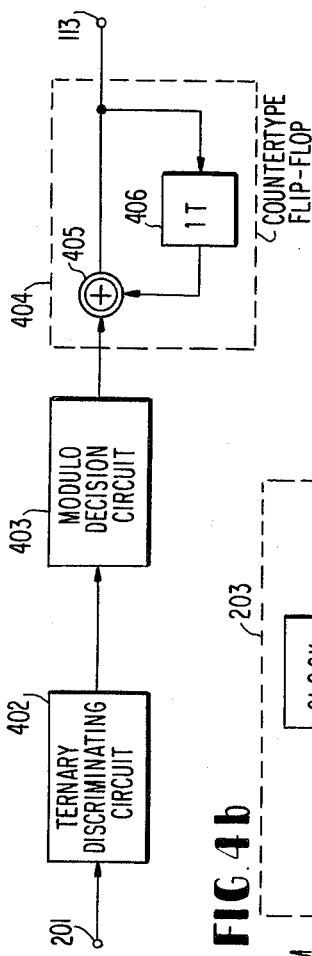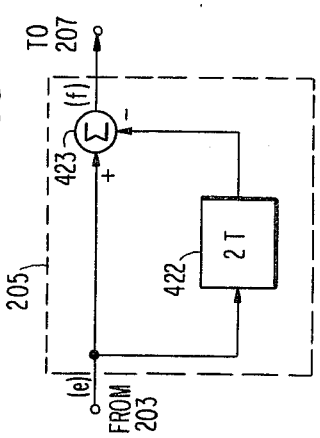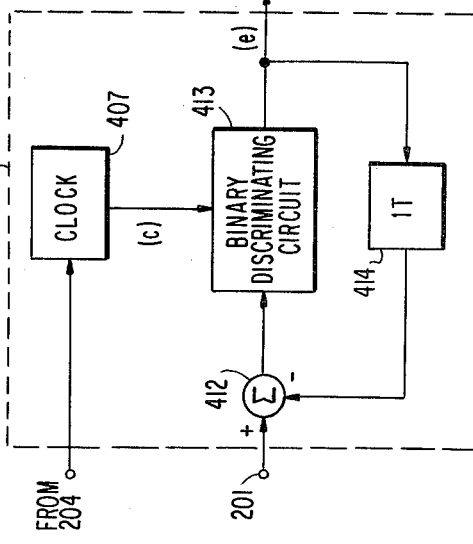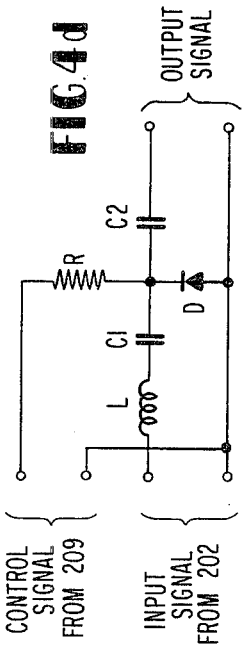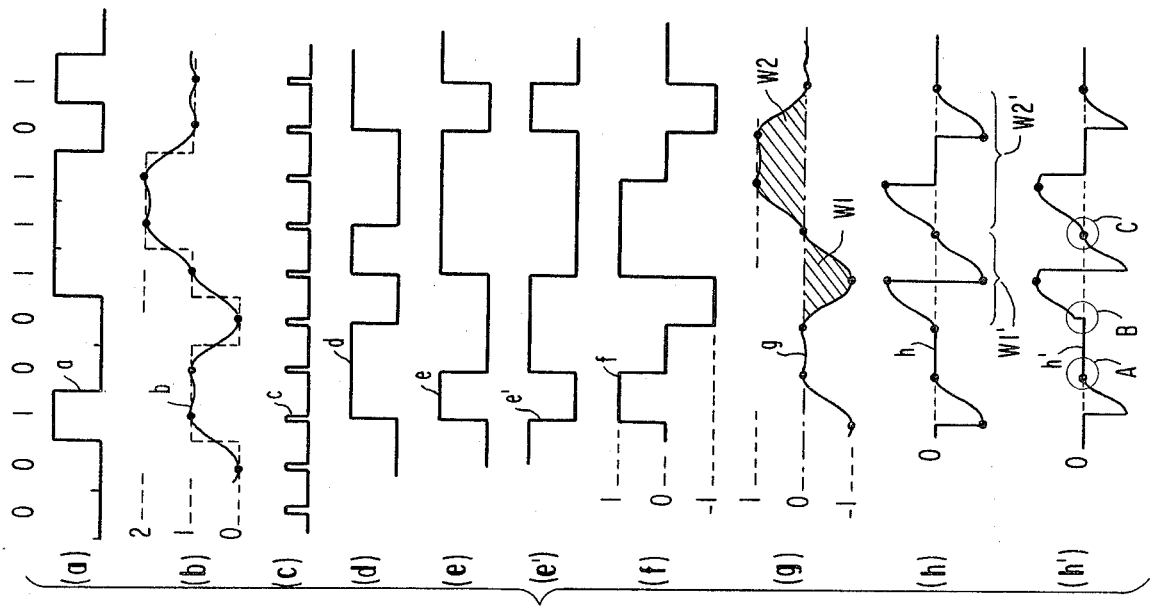

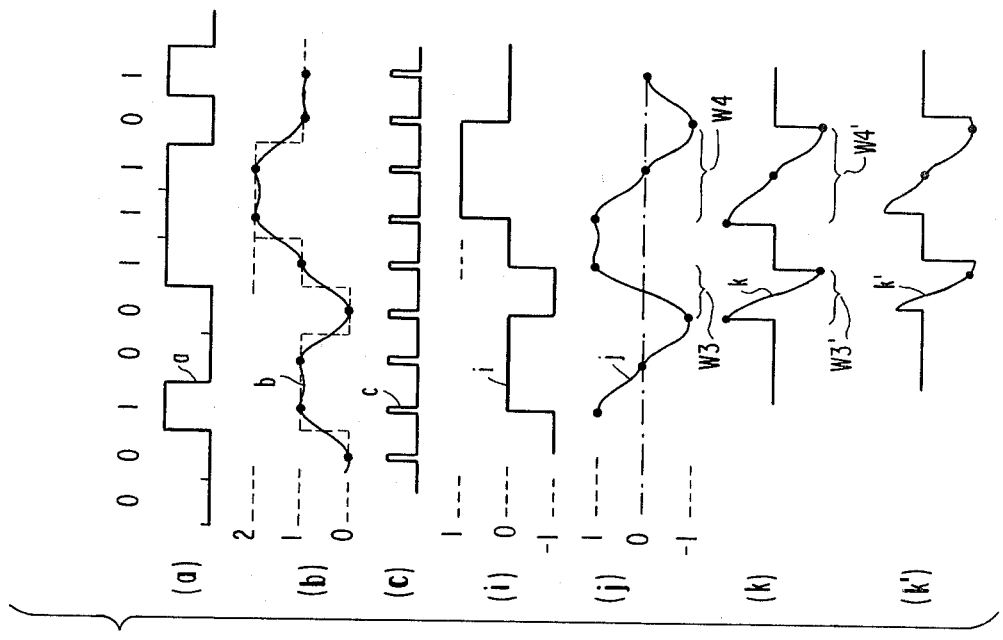
FIG.7
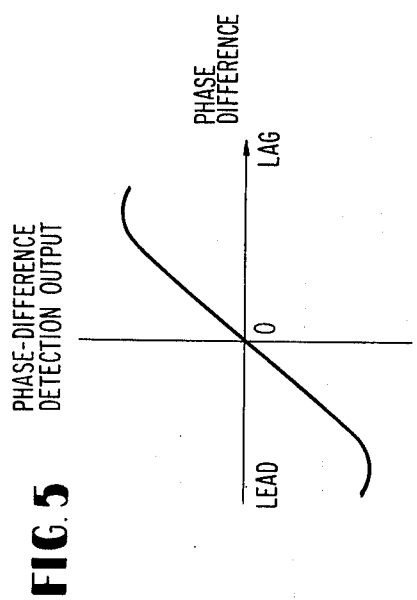
FIG.5
FIG.6

TIMING-PHASE CONTROL SYSTEM FOR DUOBINARY TRANSMISSION

BACKGROUND OF THE INVENTION

This invention relates to a timing-phase control system provided on the receiving side of a duobinary transmission system, and in particular to a timing-phase control system for duobinary transmission adaptable to high-speed PCM repeater systems using a wide-band transmission medium such as a coaxial cable.

Repeaters provided on PCM transmission lines generally have three basic functions known as the three Rs, i.e. reshaping, retiming and regeneration of received waveforms. Stated in more detail, such repeaters are required to discriminate equalized waveforms in an appropriate timing phase, thereby regenerating the original signals sent out by a transmitter. An incorrect setting of the timing phase at the repeaters will result in erroneous discrimination and deterioration of the quality of transmission.

In conventional PCM transmission systems, a timing wave needed for retiming is extracted by processing the received wave by the use of a non-linear circuit. This method is known as the self-timing system resorting to non-linear extraction, and has the advantage that the phase relationship of the extracted timing wave and the equalized waveform is relatively stable due to invulnerability to the fluctuation of the transmission characteristics which is achieved by using an appropriate equalization method. However, this non-linear extraction is not necessarily an effective method for the duobinary transmission to be described below.

One of the attempts to use a duobinary transmission system for PCM transmission is proposed by Y. Higo and A. Sawai in "Experimental Study on 800 Mb/sec Duobinary Coaxial PCM Transmission with DC Restoration Technique" published in the *Conference Record of the 1976 International Conference on Communications* held in Philadelphia, Pa., June 14–16, 1976, pp. 6-11 through 6-16 (Reference 1). In the duobinary transmission, a single pulse supplied from the transmitter is equalized into a wide pulse spanning two time slots, and consequently takes a waveform in the form of a 0110... pattern as viewed at the timing points. Accordingly, if binary information represented by "0" or "1" is sent out from the transmitter, the equalized output on the receiving side will become ternary information represented by "0", "1" or "2" because of the overlapping between pulses. By subjecting the received ternary information to suitable code conversion processing, the original binary information is obtained. For details of this code conversion technique, reference is made to the article entitled "Correlative level coding for binary-data transmission", by Adam Lender published in *IEEE Spectrum*, February, 1966, pp. 104 to 115 (Reference 2).

Such duobinary transmission is an effective method for efficient utilization of the frequency band because it can transmit information having the same pulse repetition rate within about one half of the frequency band needed in the conventional PCM transmission. However, owing to the narrower transmission band in the duobinary transmission, the extraction of timing information becomes difficult by a simple application of the known non-linear extraction technique.

To solve this problem, in the system described in Reference 1, a pilot signal serving as the timing information is transmitted from the transmitter superimposed on the transmission signal and is extracted by a tank circuit or the like provided at the receiver. This technique is known as the external timing method. However, unlike the above-mentioned self-timing method using non-linear extraction, the external timing method has the disadvantage that a relative deviation in the discrimination timing phase tends to occur due to variation in pilot phase setting at the transmitter as well as phase changes in transmission characteristics.

SUMMARY OF THE INVENTION

An object of the present invention is therefore to provide a stable timing-phase control system for duobinary transmission free from the above-mentioned disadvantages.

The present system comprises a discriminating and regenerating circuit for recovering the transmitted digital signal by discriminating and regenerating in an appropriate timing phase based on an input equalized duobinary waveform, a phase varying circuit for varying the phase of a timing signal externally supplied to said discriminating and regenerating circuit, a derivative waveform generating circuit responsive to the output of said discriminating and regenerating circuit for obtaining a waveform corresponding to the time differential of said duobinary waveform, a multiplier for multiplying the output of the derivative waveform generating circuit and said equalized duobinary waveform by each other in a predetermined phase relationship, and a low-pass type amplifier for amplifying the output of said multiplier and for supplying the time average thereof as its output, whereby the output of said amplifier, after being given a suitable D.C. offset, is negatively fed back to a control input terminal of said phase varying circuit.

Also, the present system comprises a discriminating and regenerating circuit for discriminating an equalized duobinary waveform in an appropriate timing phase and for regenerating a duobinary signal free from waveform distortion, a phase varying circuit for varying the phase of a timing signal externally supplied to the discriminating and regenerating circuit, a differentiating circuit for differentiating said equalized duobinary waveform on a time scale, a multiplier for multiplying the output of this differentiating circuit and that of said discriminating and regenerating circuit in a predetermined phase relationship, and a low-pass type amplifier for amplifying the output of the multiplier and for supplying the time average thereof as its output, whereby the output of said low-pass type amplifier, after being given a suitable D.C. offset, is negtatively fed back to a control input terminal of said phase varying circuit.

BRIEF DESCRIPTION OF THE DRAWINGS

Next, the present invention will be described in greater detail in conjunction with the accompanying drawings in which:

FIGS. 3(*a*) through 3(*h'*) show waveforms for explaining the operation of this invention;

FIGS. 4(*a*) through 4(*d*) illustrate in detail parts of the embodiment of FIG. 2;

FIG. 5 is a diagram illustrating the phase difference detecting characteristic of the present system;

FIG. 6 illustrates another embodiment of this invention; and

FIGS. 7(a) through 7(k') show waveforms for explaining this operation of the second embodiment.

DESCRIPTION OF THE PREFERRED EMBODIMENTS

Figure 1:
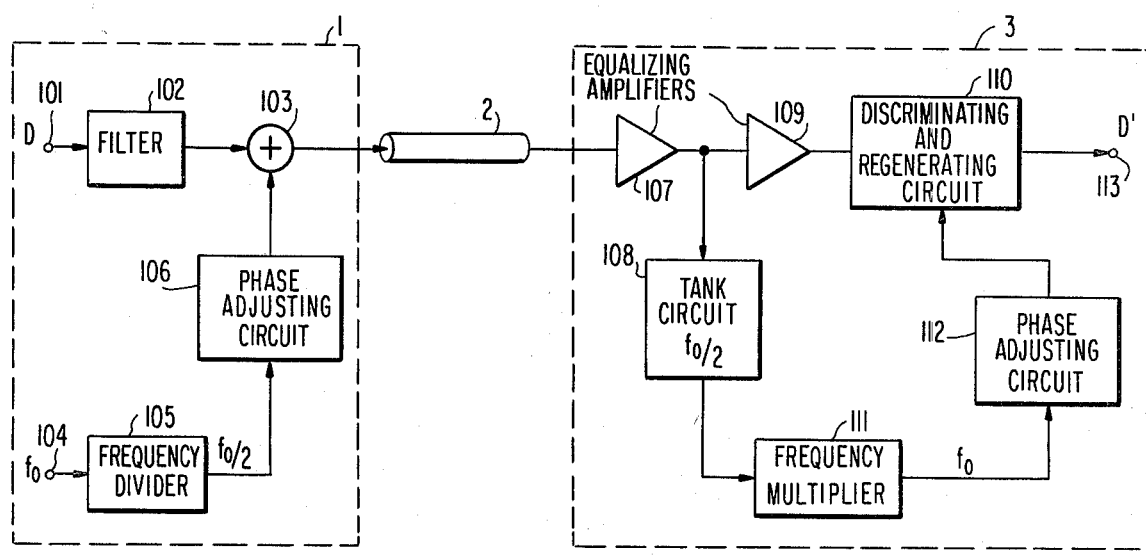
FIG. 1 is a duobinary transmission system using an external timing method.

Referring to FIG. 1, reference numerals 1, 2 and 3, respectively, represent a transmitter, a transmission line and a receiver. This transmission system is described in FIG. 1 of Reference 1. Digital information D to be transmitted is fed from a terminal 101 of the transmitter 1 to an adder 103 through a filter 102. Meanwhile, to another terminal 104 is supplied a sinewave having the same frequency as the pulse repetition frequency $f_o$ of the information D. Although this sinewave can be directly transmitted to the receiver 3 as a pilot signal, it is halved in frequency by a frequency divider 105 into a sinewave having frequency $f_o/2$ before being fed to the adder 103 through a phase adjusting circuit 106 with a view to effectively utilizing the frequency band because frequency $f_o/2$ is not used in duobinary transmission. The output of the adder 103 is the transmission signal. The phase adjusting circuit 106 controls the adding of the sinewave of frequency $f_o/2$ to the wave of the information D in a predetermined phase relationship. This phase relationship is fixed after it is properly adjusted. Since the components of the information D in the vicinity of frequency $f_o/2$ need not be transmitted, the filter 102 removes the component of frequency $f_o/2$ so that its undesirable effect on the pilot sinewave can be averted.

The transmission signal produced in this manner is sent to the receiver 3 through the transmission line 2. An equalizing amplifier 107 is used to compensate for the attenuation and distortion which the transmission signal suffers on the transmission line 2.

A part of the output of the equalizing amplifier 107 is fed to a tank circuit 108 tuned to frequency $f_o/2$, and as a result, the pilot sinewave of frequency $f_o/2$ is extracted on its output side. The other part of the output of the amplifier 107 is fed through another equalizing amplifier 109 for discrimination to a discriminating and regenerating circuit 110 with the result that the output given to the circuit 110 is discriminated and regenerated in a suitable timing phase into a regenerated output D' at the teriminal 113. The equalizing amplifier 109 basically functions to prevent the passage of the pilot sinewave and unneeded high frequency noises, both of which adversely affect the discrimination and regeneration of the transmitted digital information. Simultaneously, the amplifier 109 is so designed together with the amplifier 107 that the overall wave-transmission characteristics including those of the transmission line 2 can give duobinary responses. The output of the tank circuit 108 is turned into a clock having frequency $f_o$ by a frequency multiplier 111, and supplied to the circuit 110 through a phase adjusting circuit 112. The circuit 112 functions to properly adjust the phase relationship of the clock of frequency $f_o$ to the output of the equalizing amplifier 109 so that the discrimination and regeneration can be achieved in a desirable timing phase. If all other parts of the transmitter and receiver are ideally formed, the circuit 112 like its counterpart in the transmitter, may be fixed once it is properly adjusted. However, as a practical matter, changes in the phase setting of said circuit 106 of the transmitter and the characteristics of the circuits 108, 109 and 111 of the receiver due to aging, manufacturing tolerances and thermal effects occur with the lapse of time, and the circuit 112 should desirably have a function to solve these drawbacks.

In this connection, the present invention aims at designing said circuit 112 to be automatically controllable to achieve the negative feedback control of the timing phase depending on a phase control signal extracted by an appropriate means. Such extraction of the phase control signal should be so achieved that a positive or negative signal can be generated depending on whether the timing phase leads or lags behind the normal phase with the duobinary equalized waveform input of the discriminating and regenerating circuit as a reference. Whereas many different phase difference detecting means are known for regular reference signals such as sinewave signals, these detecting means cannot be applied to the duobinary equalized waveform, which generally irregularly varies with the digital information transmitted and does not have a periodic nature. For this reason, many reports have been made on techniques to compute the optimal discrimination of phase from such irregularly varying equalized waveforms of the digital tranmission system. Most of these techniques propose to seek the peak time or symmetrical time of the single pulse response, or the time of minimal intersymbol interference by arithmetic processing of a digital signal. Though they are effective in low speed data transmission where no arithmetic processing problem can occur, they are virtually useless in a high speed range where real time or analog signal processing is inevitably needed. One of the know methods to extract the timing wave by an analog process is the self-timing method using a technique known as the rectification-extraction wherein the rectification output of a pair of diodes is passed through a tank circuit having a high Q value to extract the periodic component. Also, this method can conceivably be applied to the duobinary waveform by performing the rectification-extraction operation after the waveform is subjected to a differentiating circuit since the duonbinary waveform has a poor zero-crossing characteristic (the frequency of crossing the average level). However, since the output level of the rectification-extraction circuit widely fluctuates with the pattern of the transmission signal, a clock signal of a fixed amplitude is obtained by the use of either a limiter circuit with a wide dynamic range or a phase synchronizing oscillator. Limiter circuits to cover a wide dynamic range, though having relatively simple circuit structures, have the disadvantage of conspicuous output jitter. In contrast, in the case where its use is permissible, the phase synchronizing oscillator may provide a fairly desirable solution to the problem, whereas its use is not desirable in the case where the circuit scale must be minimized as in a repeater for PCM transmission.

On the other hand, a repeater using an external timing technique to which the present invention is applicable, can as well have a structure which, by the combination of a rectification-extraction wave and a pilot sinewave, controls the phase of the sinewave to obtain a stable clock signal. However, the disadvantage of this structure is the duplication of tank circuits between the rectification-extraction and the pilot extraction.

The present invention is therefore aimed at providing a timing phase control system adaptable to said repeater without duplication of the tank circuits.

Figure 2:
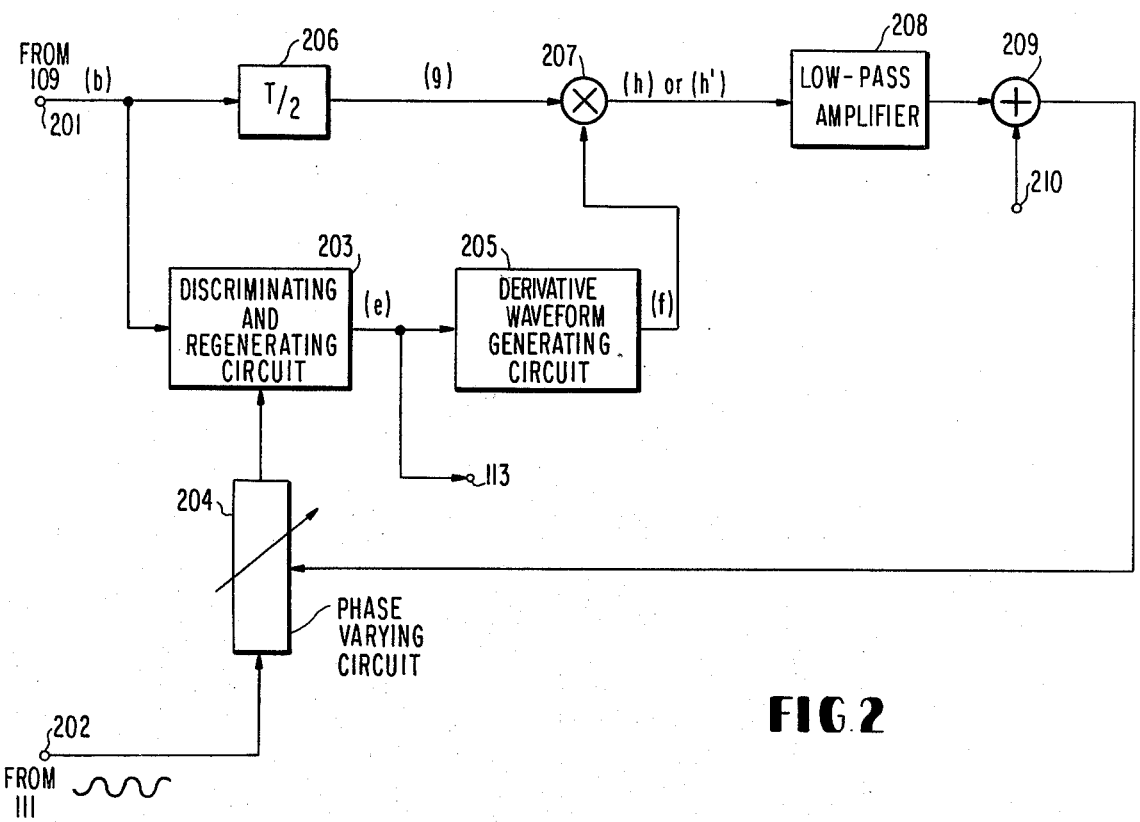
FIG. 2 illustrates one embodiment of the present invention.

In FIG. 2 which shows one embodiment of this invention, each of the signals handled is basically analog-processed, and parenthesized letters indicate the waveforms respectively corresponding to FIGS. 3(a) through 3(h'). A duobinary equalized waveform is provided at a terminal 201 corresponding to the output side of the equalizing amplifier 109 of FIG. 1. A timing signal is fed to a terminal 202 of FIG. 2 corresponding to the output side of either the tank circuit 108 or the frequency multiplier 111 of FIG. 1. It is supposed now that the terminal 202 corresponds to the output side of the frequency multiplier 111. A part of the duobinary equalized waveform at the terminal 201 is fed to a discriminating and regenerating circuit (referred to as DR circuit) 203, and discriminated and regenerated in a suitable timing phase into a regenerated output D'. The circuit 203, needless to say, corresponds to the circuit 110 of FIG. 1. Reference numeral 204 denotes a phase varying circuit for varying the phase in response to a control signal. The timing signal received from the terminal 202 is supplied through this circuit 204 to the DR circuit 203.

A brief description of the operation of the DR circuit 203 will be given hereunder. To simplify the description, the digital information D to be transmitted is assumed to be binary.

Referring to FIGS. 3(a) through 3(h'), waveforms a through e and e' relate to the operation of the DR circuit 203. The waveform a represents said information D with the binary amplitude of either 0 or 1. The overall transmission characteristics of the duobinary equalization are basically expressed in the form of linear addition of the waveform a delayed by one time slot T (the pulse repetition period of the information D) to the original waveform a. If the waveform a is 0010011101 . . . for instance, the result of such analog delayed addition becomes 011012211 . . . as viewed from the second time slot as shown by the broken line of the waveform b. Since an actual duobinary equalizing circuit is so designed as to suppress as much as possible unneeded high frequency components for the purpose of removing noise, the duobinary equalized waveform fed to the terminal 201 of FIG. 2 is like what is represented by the solid line of the waveform b. The discrimination and regeneration of the duobinary waveform is accomplished in the following manner. First, the solid line of the waveform b is discriminated at the timing point where the waveform c (i.e., the clock pulse with repetition frequency $f_o$ generated from the clock generating circuit of FIG. 4(b)) is supplied to determine its level to be 0, 1 or 2; next, if it is 0 or 1, 0 or 1 is taken as it is, but a 2 level is regarded as 0. The binary waveform d thus obtained is passed through a counter-type flip-flop to give the waveform e, or the waveform e' having a reverse polarity thereto depending on the initial condition. The waveform e or e' is determined to be identical with the waveform a, except in polarity, to complete the discrimination and regeneration (see FIG. 7 in Reference 2, page 109).

The above-mentioned DR circuit 203 is well-known as shown in FIG. 4(a). In that figure, reference numeral 201 represents the input terminal of duobinary equalized waveform; 402, a ternary discriminating circuit; 403, a modulo decision circuit consisting of a rectifier circuit to accomplish 0→0, 1→1 and 2→0 modulo coordination; and 404, a counter-type flip-flop. It is also a well known fact that the flip-flop 404 may be represented as a circuit to accomplish the feedback operation through the combination of a digital adding circuit 405 and a delaying circuit 406 whose delay time is one time slot T. Reference numeral 113 indicates an output terminal issuing discrimination and regeneration signals. With this discrimination method, the regeneration of the waveform e or the waveform e' is ambiguously determined depending on the initial state of the flip-flop 404 and/or an error output of said decision circuit 403. For this reason, with this invention, the DR circuit 203 is designed so as to definitely supply either the waveform e or the waveform e'. For instance, the circuit may be composed of a feedback decoding decision circuit shown in FIGS. 1, 7 and 8 of Reference 1.

Referring to FIG. 4(b), the circuit 203 is shown in greater detail. Reference numerals 201 and 113 denote an input terminal and an output terminal, respectively, which correspond to the input terminal and the output terminal of FIG. 4(a); 412, an ordinary subtracting circuit; 413, a binary discriminating circuit; and 414, a delaying circuit whose delay time, like that of the delaying circuit 406 of FIG. 4(a), is one time slot T. The polarity of the waveform (e in FIG. 3) emerging at the output terminal 113 of this circuit is definite.

Next will be explained how the control signal of the present system of this invention is generated. This invention primarily aims at tracking the deviation of a single pulse waveform, among duobinary equalizing waveforms from the symmetrical time point. This single pulse waveform means a waveform of . . . 101 . . . as seen in the 4th, 5th and 6th time slots counted from the left, in the waveform b of FIG. 3 with the intermediate level 1 as reference. This waveform may take a pattern of . . . 121 . . . in some other instance. It will be further understood from the following explanation that, in such single waveform, the inbetween level may continue over plural time slots as in . . . 1001 . . . or . . . 1221 . . . . Now, irrespective of whether such single waveform is above or below the reference level, it is required to extract a phase control signal which can indicate whether the timing signal leads or lags behind the regular timing point. In the present invention, the structural elements 205 through 207 of FIG. 2 performs this function. A derivative waveform generating circuit (referred to as DWG circuit) 205 responsive to the output of the DR circuit 203, generates a waveform corresponding to the time differential of the duobinary equalized waveform supplied through the terminal 201. Reference numerals 206 and 207 indicate a delay adjusting circuit and a multiplier, respectively. While many different circuits are conceivable for this multiplier 207, the simplest is to use a wide-band balanced mixer. The delay adjusting circuit 206 is intended to adjust the temporal relationship between the duobinary equalized waveform from the terminal 201 and the output of said circuit 205 so that they are multiplied by each other in a prescribed phase relationship in the multiplier 207.

This prescribed phase relationship is made clear from the waveform diagram of FIG. 3. In FIG. 3, the waveform f is the derivative waveform of the duobinary waveform produced from the discriminated and regenerated waveform e, and has an amplitude of +1 with reference to the rising part of the waveform b, −1 to the falling part of the same and 0 to the constant level part of the same. A specific example of the DWG circuit 205 to produce the waveform f from the waveform e is shown by the differential circuit illustrated in FIG. 4(c) which comprises a two-time slot (2T) delay circuit 422 and a subtracting circuit 423. Actually, the subtracting circuit 423 is implemented, for instance, by a differential amplifier. Now, since the waveform f is produced from the waveform e, it does not exactly correspond to, but lags the rising and falling times of the waveform b. This lag occurs because the waveform e is generated fundamentally based on the timing wave of the waveform c. Accordingly, the length of the delay which said delay adjusting circuit 206 of FIG. 2 should have is so adjusted as to eliminate said lag for the derivative waveform f obtained with the timing wave of the waveform c in a normal phase relationship with the duobinary waveform of the waveform b, i.e., in a phase relationship where the amplitude level of each can be most efficiently discriminated. If the waveform propagation time through the circuits 203 and 205 is negligible, the length of this delay is approximately equal to a half of a clock period; namely, to T/2. In a specific instance where the equalization is ideally achieved and the symmetry of said single waveform is exact, the delay length can be set equal to T/2. In a practical circuit, obviously delays in the waveform propagation may occur in a number of parts, necessitating the delay adjustment, conversely, on the output side of the DWG circuit 205. FIG. 3 illustrates the case where the waveform g is obtained by delaying the waveform b by approximately T/2.

Once the phase relationship is adjusted as described above, on the output side of the multiplier 207 of FIG. 2 emerges the waveform h as the product of the waveforms f and g of FIG. 3, provided that the amplitude of the waveform g is so set as to vary in three levels, between +1 above the reference level, or the middle level of 0, and −1 below it. Practically, the transmission lines and equalizing-amplifier system usually have cut-off characteristics against a direct current (D.C.). Therefore, amplitude levels of 0, 1 and 2 are assumed as for the waveform b, the middle level will automatically settle at zero as in the waveform g. More exact observation reveals that the middle level itself slowly fluctuates around the zero level under the effect of the D.C. cut-off. This fluctuation is attributed to the noncoincidence in number of pulses between 0 and 1 in a certain time length of the digital information D. This undesirable effect, however, can be reduced to be negligible by the use of a known data scrambler.

In connection with FIG. 3, the detection of the relative phase difference between the input duobinary waveform b and timing clock c is performed as follows: The single pulse response W1 ( . . . 010 . . . ) and W2 ( . . . 0110 . . . ) of the waveform g turn into W1' and W2', respectively, of the waveform h representaive of the multiplication result. If the transition time point of the waveform f coincides with the symmetrical time point of the waveform W1 when the waveform W1 is laterally symmetrical, the average D.C. component of W1' becomes zero. This also applies to the case where the same level continues, as in the waveform W2. If the phase of a clock given by the waveform c lags for some reason, the waveform f is delayed with the consequence that in the multiplication result, the area on the positive side increases and that on the negative side decreases as in the waveform h'. It follows, therefore, that a positive D.C. component emerges on the average. Conversely, if the clock phase of the waveform c leads, the multiplication result has a negative D.C. component on the average. To be more exact, because parts A and B in the waveform h' can be separated by a zero amplitude time interval and on the other hand because a part C in the same waveform is not so separated, there is a difference in the magnitude of the obtained average D.C. component. Further, the longer the in-between zero amplitude intervals, the smaller the obtainable absolute value of the average D.C. component. It can therefore be concluded that a duobinary waveform desirable for such phase-difference detection is one whose amplitude level frequently varies and whose D.C. fluctuation is negligibly small. Such phase-difference detection output; namely, the average D.C. component contained in the multiplication result, can be obtained by passing the output of the multiplier 207 through a low-pass type amplifier 208.

FIG. 5 illustrates a general trend of the average phasedifference detection output of the multiplier 208 in response to a relative phase variation of the timing clock. The saturation of the phase-difference detection output beyond a certain extent of the phase variation is obviously predictable from the nature of the duobinary equalized waveform. The phase-controllable range is the linear portion of the phasedifference detection curve where no saturation takes place.

The phase-difference detection output, after being added in an adder 209, to a bias voltage supplied from a terminal 210 to determine the operation point of said phase varying circuit 204, is fed back as the phase control signal to the circuit 204 mentioned above. As the clock of the waveform c of FIG. 3 is produced from the output of the circuit 204, a closed loop is formed. This closed loop should be so designed as to function as a negative feedback loop. Incidentally, as shown in FIG. 4(d), the circuit 204 is composed of D.C. cut-off condensers C1 and C2, a variable capacity diode D, a coil L and a high valued resistor R so that the output may be a sinewave resulting from the phase variation of the input pilot sinewave in response to said control signal.

Next, a brief explanation of the phase-difference detection will be given in the case where each single pulse of the equalized waveform is asymmetrical. Asymmetrical components of the waveform serves to bias the phase-difference detection characteristic illustrated in FIG. 5. If, for instance, the single pulse W1 (not shown) of the equalized waveform g of FIG. 3 is steep on the fore slope and gentle on the rear slope, the peak of this single pulse moves ahead of the point indicated in the figure. In this instance, W1' of the output waveform h gives a positive D.C. component on the average. This can be readily understood if the waveform is regarded as the sum of the symmetrical and asymmetrical components. In the event that the single pulses of the equalized waveform are asymmetrical as in the above cited example, the characteristic of FIG. 5 moves upward as a whole by the quantity of the D.C. component attributable to the asymmetrical component. As a result, the point where the phase-difference detection output is zero moves to the left, i.e., in the leading direction of the timing phase. If the asymmetry of the waveform is in a reverse direction and the peak time point of the above-mentioned single pulse W1 lags behind that of the waveform g of FIG. 3, the point where the phase-difference detection characteristic is zero in FIG. 5 moves to the right, i.e., in the lagging direction of the timing phase. Since the phase control loop of FIG. 2 operates to minimize the phase-difference detection output, it will be understood that the present system can follow the asymmetry of waveform to achieve an appropriate timing phase control.

Referring to FIG. 6 which illustrates another embodiment of the present invention, the same reference numerals correspond to those of FIG. 2. In the embodiment of FIG. 6, a discriminating and regenerating (DR)

circuit 402' and a derivative waveform generating (DWG) circuit 205' of FIG. 6 are different from those of FIG. 2 in structure. In contrast to the multiplier 207 of FIG. 2 whose inputs are the duobinary equalized waveform and the digital derivate waveform corresponding to it, the multiplier 207' of the system of FIG. 6 receives as its inputs the discriminated and regenerated digital duobinary waveform and the derivative waveform produced in an analog procedure from the duobinary equalized waveform. Accordingly, the DR circuit 402' functions to directly discriminate and regenerate each multi-value level of the input duobinary equalized waveform. On the other hand, the DWG circuit 205' generates a 1T delay differentiation waveform of the duobinary equalized waveform, and can be constructed similarly to the circuit 205 of FIG. 4(c) by replacing the delay circuit 422 having a 2T delay of FIG. 4(c) with one having a 1T delay. In FIG. 6, one part of the duobinary equalized waveform given from the terminal 201 is discriminated and regenerated in the circuit 402' in response to the timing signal supplied from the phase varying circuit 204. The other part of the input duobinary equalized waveform, after being differentiated in the circuit 205', is multiplied in the multiplier 207' by the output of the circuit 402'.

FIGS. 7(a) through 7(k) are examples of waveforms depicting the operations of these components. In the figure, the waveforms a through c are respectively identical with the waveforms a through c of FIG. 3. The waveform i of FIG. 7 represents the output of the circuit 402', and the waveform j of the same, that of the circuit 205'. The output of the multiplier 207 has the waveform k which is the product of the waveforms i and j. In the waveform k emerge waveform fractions W3' and W4' cut out from the transitional parts W3 and W4 of the waveform j and selectively reversed in polarity depending on the slope polarity of the waveform j. If the timing phase of the discrimination is in its normal position, the average D.C. components contained in the waveform fractions W3' and W4' are zero. If the timing phase lags behind the waveform c, the multiplication result will be like, for instance, the waveform k' with a negative D.C. output on the average. Thus, the phase-difference detection characteristic has a reverse polarity to that of FIG. 5. The transitional part W3 or W4 of the waveform j corresponds to the time differential of the single pulse W1 or W2, respectively, of the waveform g in FIG. 3. In other words, the subtraction of the fore slope from the rear slope of the pulse W1 results in W3. Therefore, if the pulse W1 is steep on the fore slope and gentle on the rear slope to be so distorted that its peak time point shifts in the leading direction, the transitional part W3 is positively biased on the average. With the polarity of the waveform i taken into account, a negative D.C. component eventually appears on the average in the fraction W3' of the waveform k. Since the phase-difference detection characteristic obtained by this sytem as described above represents the reversal of the output polarity of that of FIG. 5, the system gives a control for the above-mentioned waveform distortion to shift the origin of the timing phase to be controlled in the leading direction. Thus, it is also evident that this system can provide a phase control loop to follow waveform distortions.

Incidentally, no delay adjusting circuit corresponding to reference numeral 206 of FIG. 2 is present in the embodiment of FIG. 6 because no particular delay adjustment is needed if the structural elements ideally operate as represented by the waveforms of FIG. 7. Needless to say, in an actual circuit, an appropriate delay adjustment is obviously required before the multiplication because propagation delays exist in various parts.

What is claimed is:

1. In a receiver of a duobinary transmission system of the type wherein a timing signal is transmitted superimposed on a transmission signal containing digital information, said receiver having an equalizing amplifier connected to equalize and amplify a received signal and means for extracting a timing signal from the received signal, the improvement comprising:

a discriminating and regenerating circuit connected to the output of said equalizing amplifier for recovering the transmitted digital signal by discriminating and regenerating in an appropriate timing phase the equalized duobinary waveform from said equalizing amplifier;

a phase varying circuit connected to vary the phase of said timing signal supplied to said discriminating and regenerating circuit;

a derivative waveform generating circuit responsive to the output of said discriminating and regenerating circuit for providing a differentiated output signal;

a multiplier connected to the output of said derivative waveform generating circuit for multiplying said differentiated output signal and said equalized duobinary waveform by each other in a predetermined phase relationship to produce a product signal; and a low-pass amplifier connected to said multiplier for amplifying said product signal and supplying the time average thereof at its output, said output being given a suitable D.C. offset and negatively fed back to a control input terminal of said phase varying circuit.

2. In a receiver of a duobinary transmission system of the type wherein a timing signal is transmitted superimposed on a transmission signal containing digital information, said receiver having an equalizing amplifier connected to equalize and amplify a received signal and means for extracting a timing signal from the received signal, the improvement comprising:

a discriminating and regenerating circuit connected to the output of said equalizing amplifier for recovering the transmitted digital signal by discriminating and regenerating in an appropriate timing phase the equalized duobinary waveform from said equalizing amplifier;

a phase varying circuit connected to vary the phase of said timing signal supplied to said discriminating and regenerating circuit;

a derivative waveform generating circuit responsive to the output of said equalizing amplifier for differentiating said equalized duobinary waveform on a time scale;

a multiplier connected to the outputs of said discriminating and regenerating circuit and said derivative waveform generating circuit for multiplying the recovered digital signal and the differentiated duobinary waveform by each other in a predetermined phase relationship to produce a product signal; and a low-pass amplifier connected to said multiplier for amplifying said product signal and supplying the time average thereof at its output, said output being given a suitable D.C. offset and negatively fed back to a control input terminal of said phase varying circuit.

* * * * *

UNITED STATES PATENT AND TRADEMARK OFFICE
CERTIFICATE OF CORRECTION

PATENT NO. : 4,207,528
DATED : June 10, 1980
INVENTOR(S) : Akira SAWAI

It is certified that error appears in the above—identified patent and that said Letters Patent is hereby corrected as shown below:

IN THE PREFACE

[73] - delete "Assignees" and insert -- Assignee -- .

- delete "Nippon Electric Co., Ltd., Tokyo, Japan" (second occurrence) .

[30] - delete "53/1697878" and insert -- 53/16978 -- .

Column 2, delete "Sughrue, Rothwell, Mion, Zinn and Macpeak" (second occurrence) .

Signed and Sealed this

Eighteenth Day of November 1980

[SEAL]

Attest:

SIDNEY A. DIAMOND

Attesting Officer

Commissioner of Patents and Trademarks